United States Patent
Ryan et al.

(10) Patent No.: US 6,545,676 B1
(45) Date of Patent: Apr. 8, 2003

(54) METHOD AND SYSTEM FOR CREATING A TESSELLATED APPROXIMATION OF AN OUTER ENVELOPE OF A COMPLEX MODEL

(75) Inventors: Kevin M. Ryan, Lowell, MA (US); Serge Elnitsky, Waltham, MA (US)

(73) Assignee: Parametric Technology Corporation, Needham, MA (US)

( * ) Notice: Subject to any disclaimer, the term of this patent is extended or adjusted under 35 U.S.C. 154(b) by 0 days.

(21) Appl. No.: 09/317,540

(22) Filed: May 24, 1999

(51) Int. Cl.⁷ .............................................. G06T 17/20
(52) U.S. Cl. ...................................... 345/423; 345/420
(58) Field of Search ............................... 345/419, 420, 345/423, 427, 441, 581

(56) References Cited

U.S. PATENT DOCUMENTS

| | | | |
|---|---|---|---|
| 4,685,070 A | * 8/1987 | Flinchbaugh | 364/522 |
| 5,272,642 A | 12/1993 | Suzaki | 364/474.24 |
| 5,428,718 A | 6/1995 | Peterson et al. | 395/123 |
| 5,819,016 A | * 10/1998 | Watanabe et al. | 395/119 |
| 5,912,675 A | 6/1999 | Laperrière | 345/473 |
| 5,988,862 A | * 11/1999 | Kacyra et al. | 364/578 |
| 6,044,306 A | * 3/2000 | Shapiro et al. | 700/90 |
| 6,172,679 B1 | * 1/2001 | Lim | 345/421 |
| 6,222,557 B1 | 4/2001 | Pulley, IV et al. | 345/433 |
| 6,275,225 B1 | * 8/2001 | Rangarajan et al. | 345/333 |

FOREIGN PATENT DOCUMENTS

| | | |
|---|---|---|
| EP | 241071 | 1/1992 |
| EP | 397904 | 7/1994 |
| EP | 204225 | 12/1994 |
| JP | 9138864 | 5/1997 |
| WO | WO 97/03417 A1 | 1/1997 |
| WO | WO 97/22952 | 6/1997 |

\* cited by examiner

Primary Examiner—Mark Zimmerman
Assistant Examiner—Mang Padmanabhan
(74) Attorney, Agent, or Firm—Lahive & Cockfield, LLP

(57) ABSTRACT

The present invention relates to providing a system and method for obtaining a tessellated approximation of an outer envelope of a geometrical representation of an object. The method of the invention can be implemented in any computer platform having a facility for creating a geometrical representation of an object. In particular, the computer-implemented method of the invention can be incorporated into a CAD/CAM system as one of the utilities provided by such a system.

19 Claims, 14 Drawing Sheets

METHOD AND SYSTEM FOR CREATING A TESSELLATED APPROXIMATION OF AN OUTER ENVELOPE OF A COMPLEX MODEL

TECHNICAL FIELD OF THE INVENTION

The present invention relates to obtaining an approximation of an outer envelope of a geometrical representation of an object. In particular, the present invention relates to obtaining a tessellated approximation of an outer envelope of the object. Tessellation as used herein refers to representing a surface by a plurality of triangles.

BACKGROUND OF THE INVENTION

Conventional computer aided design (CAD)/computer aided manufacturing (CAM) systems provide models of three dimensional objects that include geometrical representations of the objects.

A designer employing a CAD/CAM system may want to create an approximation of the outer surfaces of a geometrical representation of an object. For example, the designer may need access to data representing the outer surfaces of the object to be able to incorporate the object into a structure to be designed. In many applications, such a designer needs to access a geometrical representation of only the outer surfaces without a need to access data corresponding to the inner components and/or structures of the object. For example, a designer of a motorcycle gas tank may need data corresponding to the surface geometry of the engine, to be able to shape the tank to avoid the engine. Such a designer does not need to know about the interior components of the engine or the detailed structure of the cooling lines to accomplish her task. In an alternative example, a manufacturer intent on protecting proprietary information may want to provide a designer with data corresponding to the outer envelope of an object without disclosing to the designer the proprietary components and/or structures contained within the object.

In another application, a designer may need an approximate envelope of a volume of space swept by a moving object as it moves within its full range of motion. Alternatively, a designer may need an approximate envelope of a volume of space within which a plurality of static objects reside. In yet another application, a designer may need an approximation of the outer envelope of a digital image of a physical object, i.e., a point cloud of the object.

SUMMARY OF THE INVENTION

The present invention provides a computer-implemented method for creating a tessellated approximation of an outer envelope of a geometrical representation of an object. The method of the invention typically receives a geometrical representation that is enclosed within a bounding structure. Alternatively, the method of the invention can receive a geometrical representation that is not enclosed within a bounding structure. In such a case, the method of the invention initially encloses the geometrical representation within a bounding structure, which can have a variety of different shapes. The bounding structure is preferably selected to be a rectangular parallelepiped.

The method of the invention includes a step of subdividing the bounding structure into a number of cells, wherein each cell can be selected to be a rectangular parallelepiped. In a subsequent step, the method of the invention provides an outermost subset of the cells dividing the bounding structure by iteratively removing from consideration those boundary cells that do not contain any portion of the geometrical representation such that each cell in the outermost subset contains at least a portion of the outer envelope of the geometrical representation and includes at least an exposed face.

Subsequently, the method of the invention partitions each exposed face of each cell in the outermost subset into two triangles to form a first set of triangles. The method then projects the vertices of each triangle in the first set onto the outer envelope of the geometrical representation, to obtain a second set of triangles whose vertices lie on the outer envelope. The triangles in this second set provide a tessellated approximation of the outer envelope of the geometrical representation.

One aspect of the present invention relates to providing in a computer platform having a facility for generating a geometrical representation of an object, a computer readable-medium holding computer-executable instructions for creating a tessellated approximation of a geometrical representation according to the method of the present invention.

Another aspect of the invention relates to providing in a computer platform having a facility for generating a geometrical representation of an object, a transmission medium for transmitting computer-executable instructions for creating a tessellated approximation of a geometrical representation of an object according to the method of the present invention.

In accordance with yet another aspect of the invention, a computer-readable medium is provided that holds computer-executable instructions for obtaining a tessellated approximation of a geometrical representation of an object through the method of the present invention.

The method of the invention can be implemented in a computer platform having a facility for generating a geometrical representation of an object. For example, a CAD/CAM system is particularly suited for implementation of the method of the invention. Such a computer platform can be programmed to produce executable instructions for practicing the method of the invention, i.e., to create a tessellated approximation of the outer envelope of a geometrical representation. Further, executable instructions for practicing the method of the invention can be stored in a computer readable medium, such as a floppy disk, a hard disk, or a CD-ROM.

One aspect of the invention relates to providing a visual display of an outer envelope, i.e., outer surfaces, of a geometrical representation without displaying components and/or structures contained within the outer envelope.

Another aspect of the invention relates to creating a tessellated approximation of a digital image of an outer envelope of a physical object, i.e., a point cloud of the object. Such a digital image can be obtained by a scanner, and be subsequently represented as a model in a CAD/CAM system. The method of the invention can be practiced on such a model to create a tessellated approximation of its outer envelope.

Another aspect of the invention relates to providing a tessellated approximation of an outer envelope of a union of a plurality of geometrical representations, e.g., a plurality of models. Each of such plurality of models can correspond to the geometrical representation of a moving object at a particular location as it moves within its full range of motion. A tessellated approximation of the outer envelope of such a union of models in accordance with the teachings of the invention is herein referred to as a motion envelope of the object. Alternatively, the plurality of models can correspond to the geometrical representations of a plurality of static objects. The tessellation method of the invention can also be employed to create an approximation of an outer envelope of a union of geometrical representations of a number of static objects.

The method of the invention for creating a tessellated approximation of a union of a set of models includes an initial step of producing an additive model that contains data corresponding to all surfaces of the set of models. The additive model can optionally include data corresponding to a number of points in the space between the surfaces of the set of models, obtained through interpolation between such surfaces. Subsequently, the method of the invention creates a tessellated approximation of the outer envelope of the additive model in accordance with the teachings of the present invention.

Illustrative embodiments of the present invention will be described below relative to the following drawings.

DETAILED DESCRIPTION OF THE INVENTION

The computer-implemented method of the invention provides a tessellated approximation of an outer envelope of an object. The method of the invention can be incorporated into a CAD/CAM system to provide a designer with the ability to create a geometrical representation of the object, and to obtain a tessellated approximation of the outer envelope of the geometrical representation. Such a designer can manipulate the tessellated approximation of the outer envelope without having to manipulate the data corresponding to the inner surfaces of the object. Further, such a designer can provide another party the tessellated approximation of the outer envelope, and hence information regarding the geometry of the outer surface, while protecting any proprietary information related to the inner components and/or structures of the object.

Figure 1:
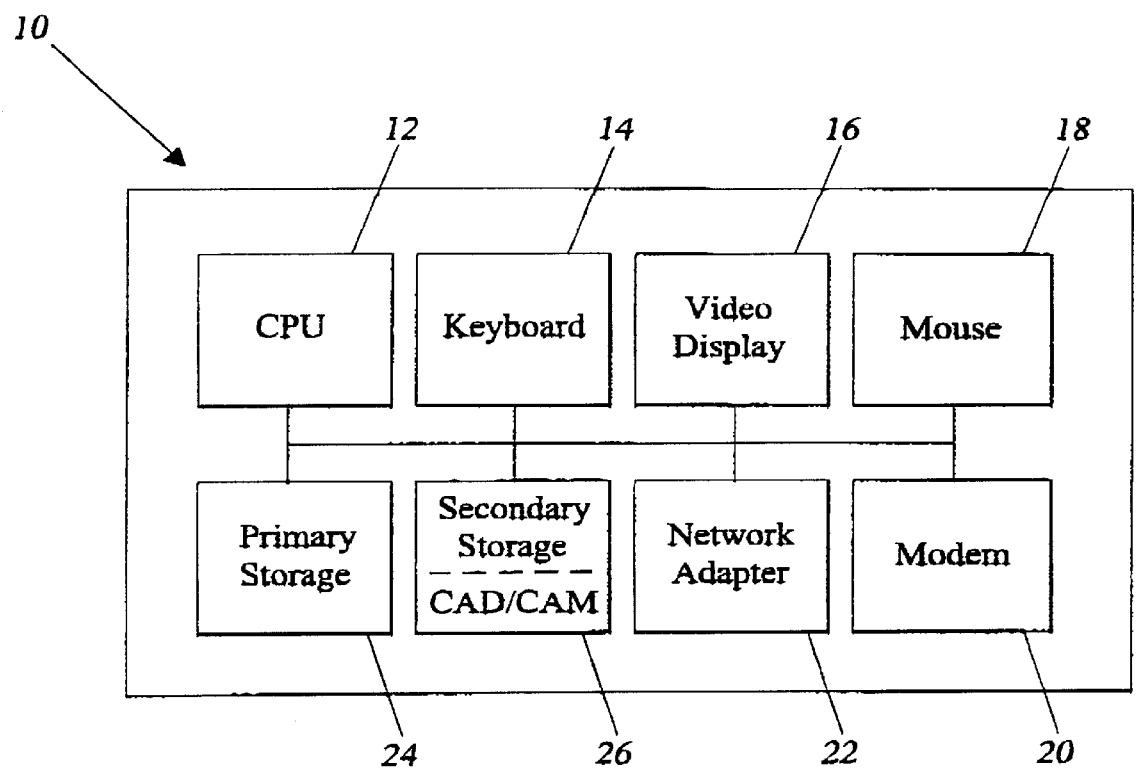
FIG. 1 is a block diagram illustrating components of an exemplary computer system suitable for practicing illustrative embodiment of the present invention.

In an illustrative embodiment of the present invention, the computer-implemented method of the invention is employed to provide a tessellated approximation of an outer envelope of a geometrical representation of an object. FIG. 1 is a block diagram that shows the components of an exemplary computer system 10 that can implement the method of the present invention. The computer system 10 includes a central processor unit (CPU) 12 for executing instructions. A number of peripheral devices, including a keyboard 14, a video display 16, and a mouse 18, may be provided as part of the computer system 10. A modem 20 may be provided to allow the computer system to communicate over analog telephone lines, and a network adapter 22 may be provided to facilitate the connection of the computer system 10 to a local area network (LAN). The computer system 10 may also include other components, such as a cable modem, for facilitating remote communications with a remote server (not shown).

The computer system 10 includes both primary storage 24 and secondary storage 26. The secondary storage 26 may include a number of different types of persistent storage. For example, the secondary storage 26 may include CD-ROMs, floppy disks, hard disks and/or any other suitable computer-readable medium including other devices that use optical, magnetic or other recording material. The primary storage 24 may also include a number of different types of storage, such as DRAM, SRAM, and the like.

The computer system 10 further includes a facility for generating a geometrical representation of an object. For example, a CAD/CAM system, such as the system produced by Parametric Technology Corporation of Waltham, Mass., U.S.A (herein "PTC") under the trade designation Pro/Engineer 2000i, can be stored in the secondary storage 26 to be utilized for producing a model corresponding to surfaces of an object or an assembly of a plurality of sub-assemblies. The video display unit 16 can provide a visual depiction of the surfaces of the model.

The secondary storage device 26 can also store executable instructions for providing a tessellated approximation of an outer envelope of a geometrical representation of an object based on the method of the present invention. In a preferred embodiment, such executable instructions are incorporated into a CAD/CAM system to provide a designer with the option of creating a tessellated approximation of the outer envelope of a geometrical representation produced by the system. Those skilled in the art will appreciate that the computer system shown in FIG. 1 is intended to be merely illustrative and not limiting of the present invention.

Figure 2:
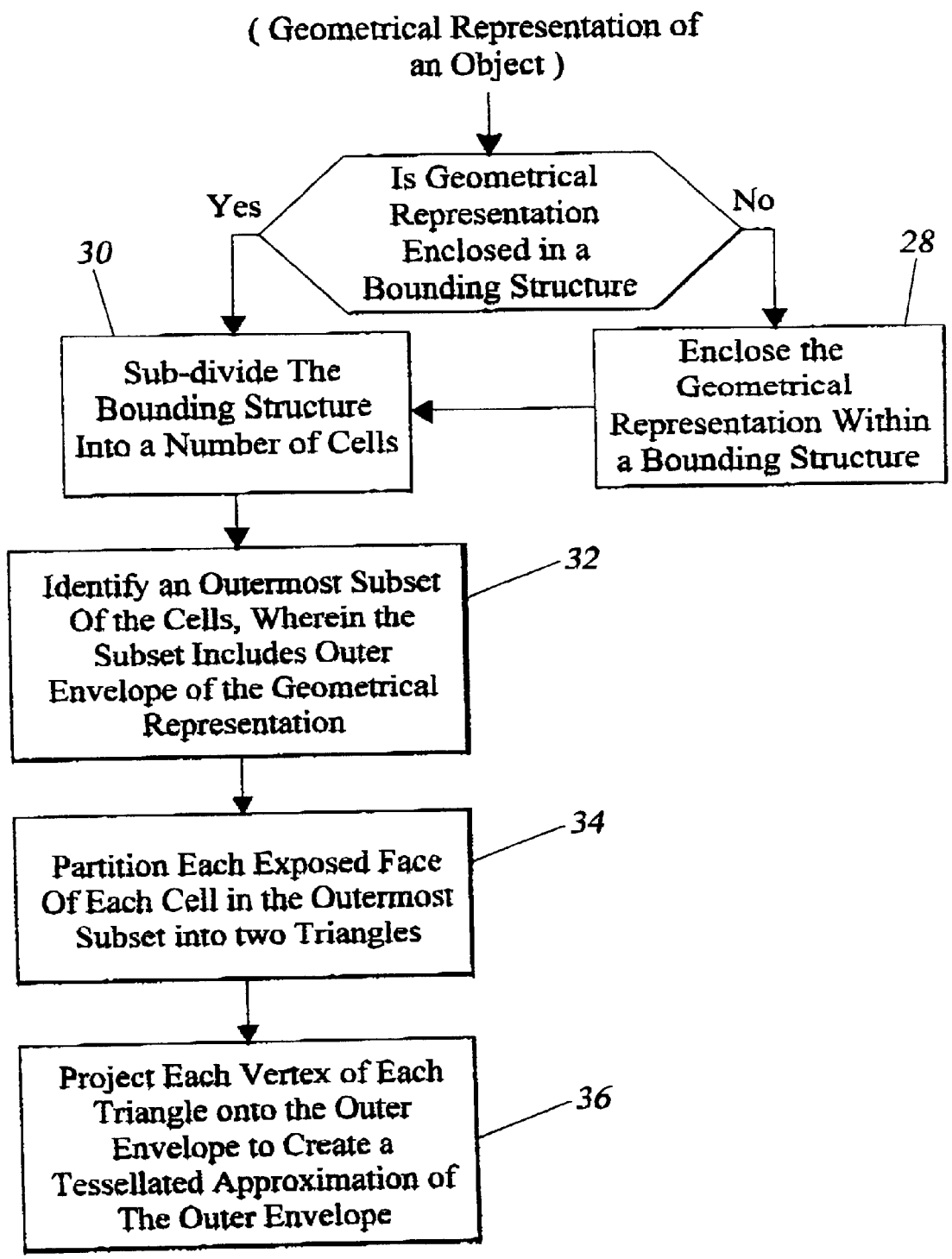
FIG. 2 is a flow chart depicting various steps of a method for obtaining a tessellated approximation of an outer envelope of a geometrical representation of an object according to the illustrative embodiment of the present invention.

FIG. 2 illustrates a flow chart depicting various steps of an exemplary embodiment of the computer implemented method of the present invention, which receives as input a geometrical representation of various surfaces of an object and/or an assembly of a plurality of sub-assemblies and/or data corresponding to a point cloud of a physical object. If the geometrical representation is not enclosed within a bounding structure, in step 28, the illustrative embodiment encloses the geometrical representation within a bounding structure. The exemplary embodiment, in step 30, subdivides the bounding structure into a number of cells. The bounding structure and the cells are preferably selected to be rectangular parallelepipeds.

In step 32, the illustrative embodiment identifies an outermost subset of the cells that sub-divide the bounding structure. The term outermost subset, as used herein, refers to those cells that collectively contain the outer envelope of the geometrical representation. The illustrative method of the invention obtains the outermost subset through removal of cells that lie beyond the outer envelope of the geometrical representation. A patent Application entitled "A method and system for identifying peripheral elements of a complex model" (Attorney docket No. PAS-089) being concurrently filed with the present application, and herein incorporated by reference, teaches a preferred method for obtaining the outermost subset. Each cell in the outermost subset contains at least a portion of the geometrical representation, and further has at least an exposed face, i.e., a surface that is not shared with a neighboring cell, and/or an exposed edge and/or an exposed vertex. An exposed edge and an exposed vertex refer to an edge or a vertex of an exposed face, respectively.

In step 34, the illustrative embodiment partitions each exposed face of each cell in the outermost subset into two triangles, thus creating a first set of triangles. Subsequently, in step 36, the vertices of the triangles in the first set are projected onto the outer envelope of the geometrical representation. In particular, for each vertex, a point on the outer envelope is found that represents the closest point on the outer envelope to that vertex. In other words, the shortest distance between the vertex and the outer envelope is the distance between the vertex and its projection onto the outer envelope. Such a projection of the vertices of a triangle on an exposed face of a cell in the outermost subset onto the outer envelope of the geometrical representation is herein referred to as snapping the triangle onto the outer envelope. Accordingly, for each triangle on an exposed face of a cell in the outermost subset, a separate triangle is identified whose vertices lie on the outer envelope of the geometrical representation of the object. These triangles whose vertices lie on the outer envelope form a second set of triangles.

A preferred embodiment of the method of the invention snaps the triangles on the exposed faces of the cells in the outermost subset onto the outer envelope of the geometrical representation in the following manner. This embodiment initially tessellates the surfaces of the geometrical representation, i.e., it represents the surfaces with a plurality of triangles. Subsequently, for each vertex V on an exposed face of an outermost cell, and for each triangle in the tessellated representation of the geometrical model, a point P that is closer to the vertex V than all other points of the triangle is found. Such a point P can lie either within the triangle, or it can lie on an edge of the triangle, or it can be one of the vertices of the triangle. Thus, for each vertex V, a set of points $(P_1, P_2, P_3, \ldots, P_n)$, each corresponding to one of the triangles in the tessellated approximation of the geometrical representation are found. A point within this set that is closer to the vertex V that all the other points within the set corresponds to the projection of point V onto the outer envelope of the geometrical representation. The method of the invention can optionally choose a set of triangles of the geometrical representation that are sufficiently close to the vertex V, and inspect only this set of triangles. For example, the method of the invention can select those triangles in the geometrical representation that intersect any cell to which the vertex V belongs.

Any two triangles in the second set corresponding to two triangles forming an exposed face of a cell in the outermost subset share a common side, i.e., they share two projected vertices. Further, any two triangles in the second set, corresponding to two adjacent triangles on separate exposed faces of a cell in the outermost subset or corresponding to two adjacent triangles on exposed faces of two different cells in the outermost subset, share a common side. Thus, the triangles in the second set have the same topological connectivity as the triangles in the first set. The second set of triangles cover the entire outer envelope of the geometrical representation of the object, thus providing a tessellated approximation of the outer envelope.

A user employing the above tessellation method can select a desired number of cells for sub-dividing the bounding structure enclosing the geometrical representation. An increase in the number of cells that sub-divide the bounding structure provides a concomitant increase in the accuracy of the tessellated approximation of the outer envelope of the geometrical representation. Such increase in accuracy, however, increases the computational time. Thus, there is a trade-off between the degree of accuracy of the tessellated approximation and the amount of time required to produce such an approximation.

Figure 3A:
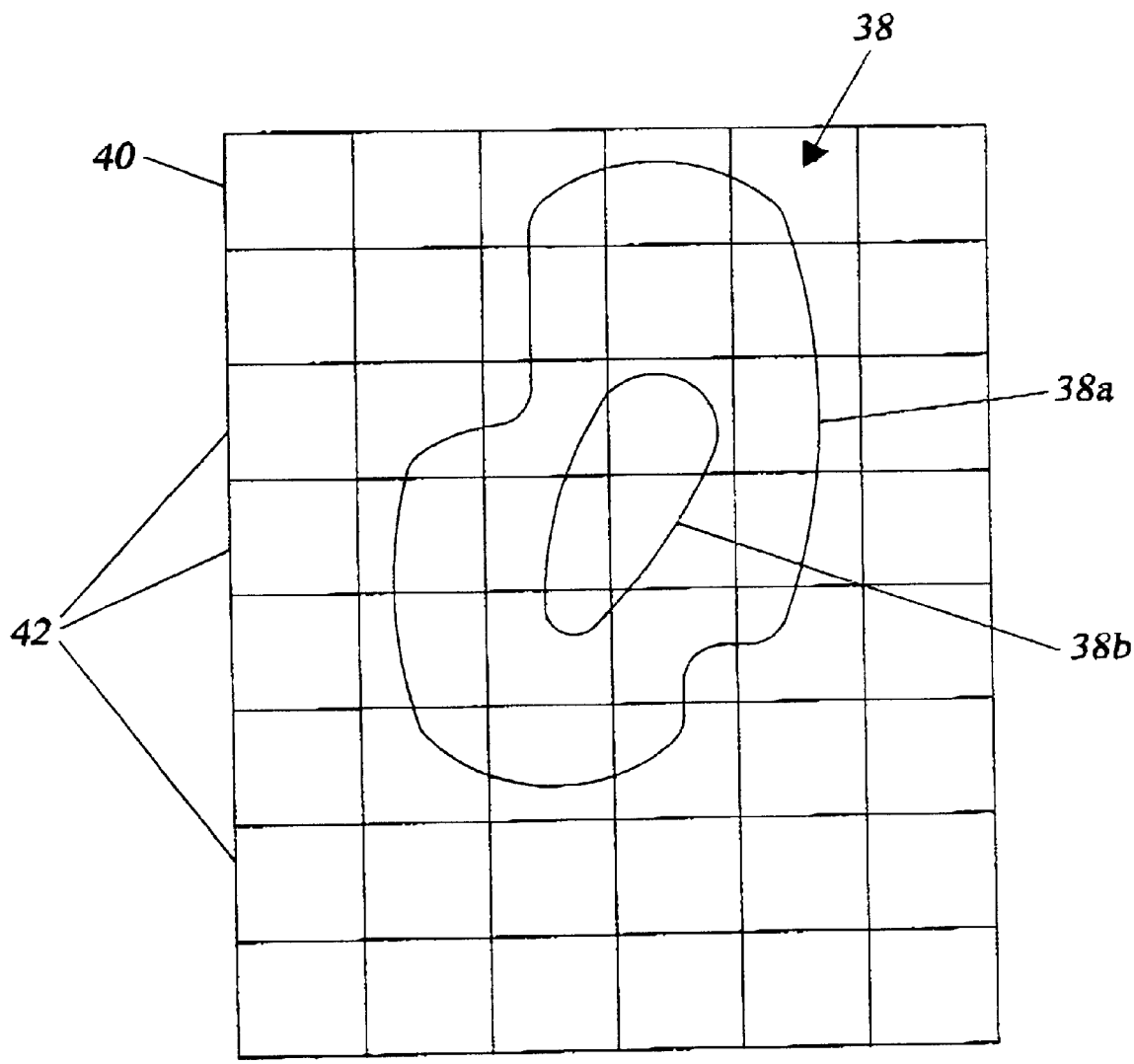
FIG. 3A is an exemplary two dimensional geometrical representation of an object, enclosed within a bounding box that is sub-divided into a number of cells.

Although the method of the invention may be practiced on a three dimensional representation of an object, an exemplary application of the above method to a two-dimensional object is presented below for exposition of the salient principles of the method of the invention. In particular, FIG. 3A illustrates a geometrical representation 38 of an object having an outer surface 38a and an inner surface 38b. The geometrical representation is enclosed within a bounding box 40 that is sub-divided into a number of cells 42 in accordance with the step 30 of the flow chart of FIG. 2.

Figure 3B:
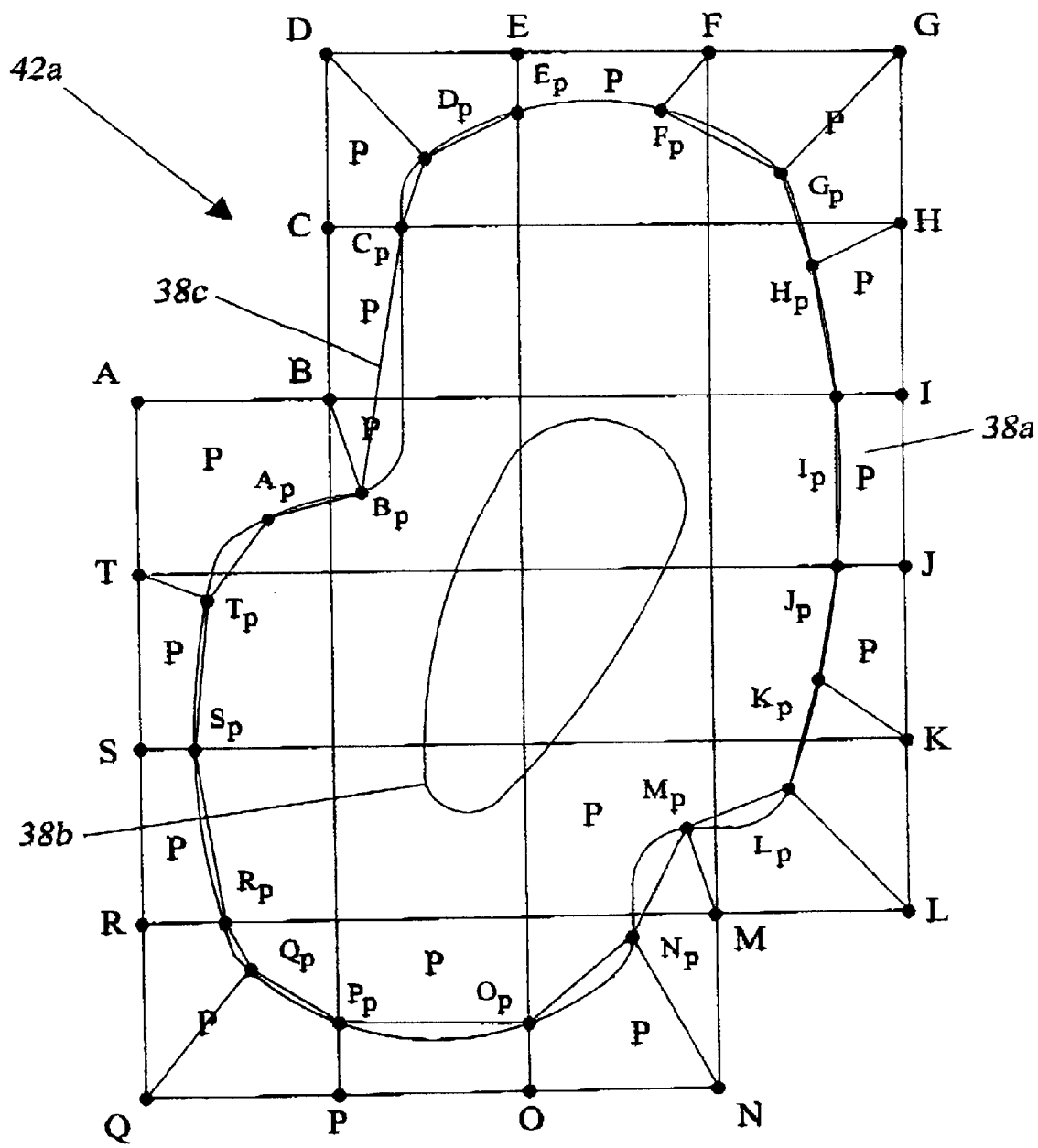
FIG. 3B illustrates an application of features of the illustrative method of the invention to the two-dimensional geometrical representation of FIG. 3A, to obtain an approximation of the outer envelope of the two-dimensional geometrical representation.
Figure 4:
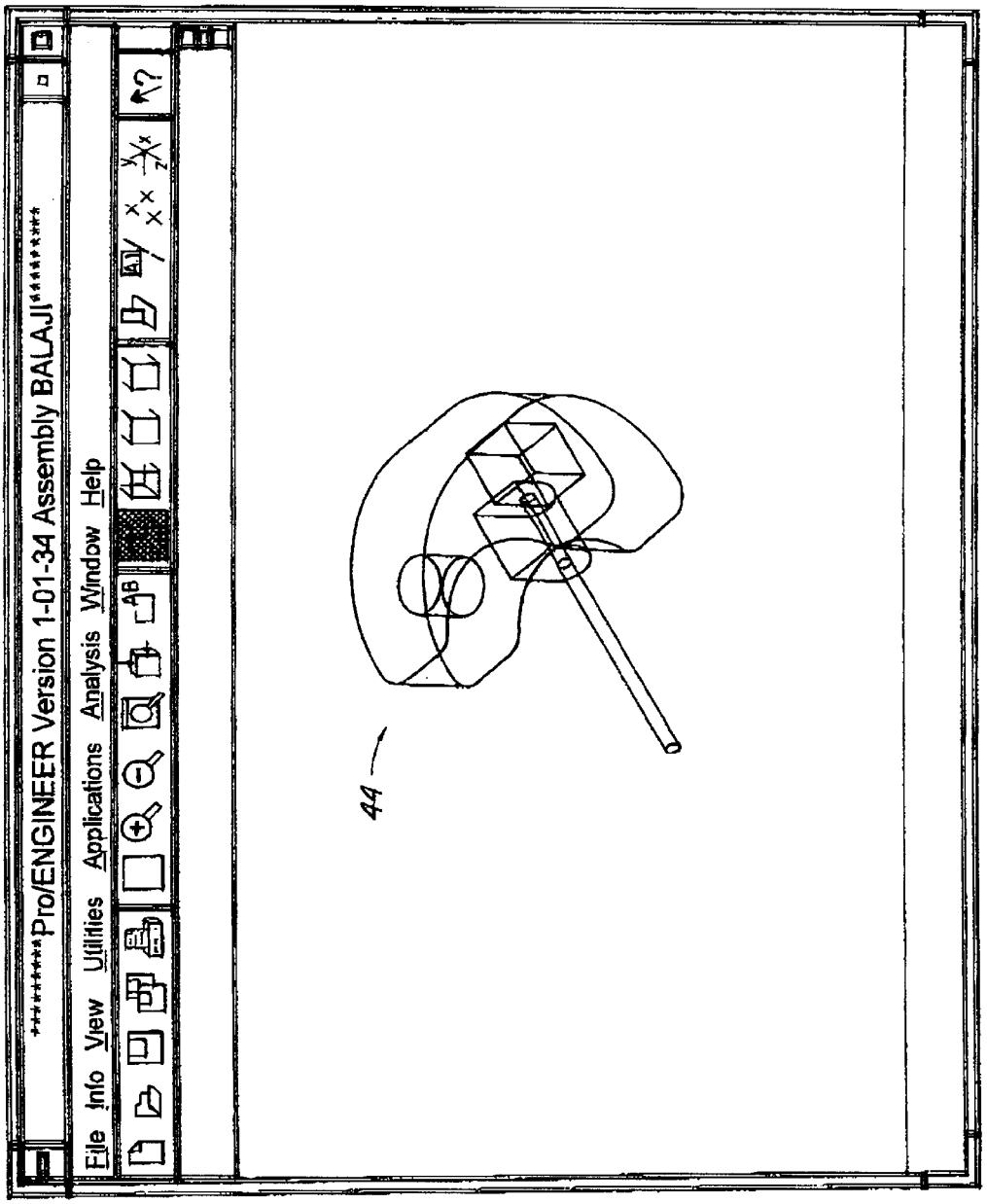
FIG. 4 illustrates a geometrical representation of a complex assembly produced by employing a CAD/CAM system.

A subset 42a of the cells into which the bounding box 42 is sub-divided is shown in FIG. 3B. This subset is obtained through removal of those cells in FIG. 3A that lie beyond the outer surface 38a of the geometrical representation 38. The cells that are designated by the letter P all include at least a portion of the outer surface 38a of the geometrical representation 38, and further include at least an exposed side. Thus, these cells form the outermost subset of the cells shown in FIG. 3A.

In the illustrative two-dimensional geometrical representation 38, each vertex of a cell in the outermost subset corresponding to the intersection of two exposed sides is projected onto the outer surface 38a. FIG. 3B shows that these vertices are designated with letters A through T, and their projections onto the outer surface 38a are designated with symbols $A_p$ through $T_p$. Each projected point on the outer surface 38a is the closest point to one of the vertices A through T. The projected points $A_p$ through $T_p$ provide an approximation of the outer surface 38a. In particular, connecting the points $A_p$ through $T_p$ provides a polygon 38c that approximates the outer surface 38a. An increase in the number of cells dividing the bounding box 42 results in a polygon having more sides, thus providing a better approximation of the outer surface 38a.

As mentioned above, the method of the present invention is typically practiced on a three dimensional geometrical representation to create an approximation of the outer surfaces of such a representation. FIGS. 4–7, show an application of the illustrative embodiment of the invention to such a geometrical representation 44 of a three dimensional complex assembly, which was produced by employing a CAD/CAM system.

Figure 5:
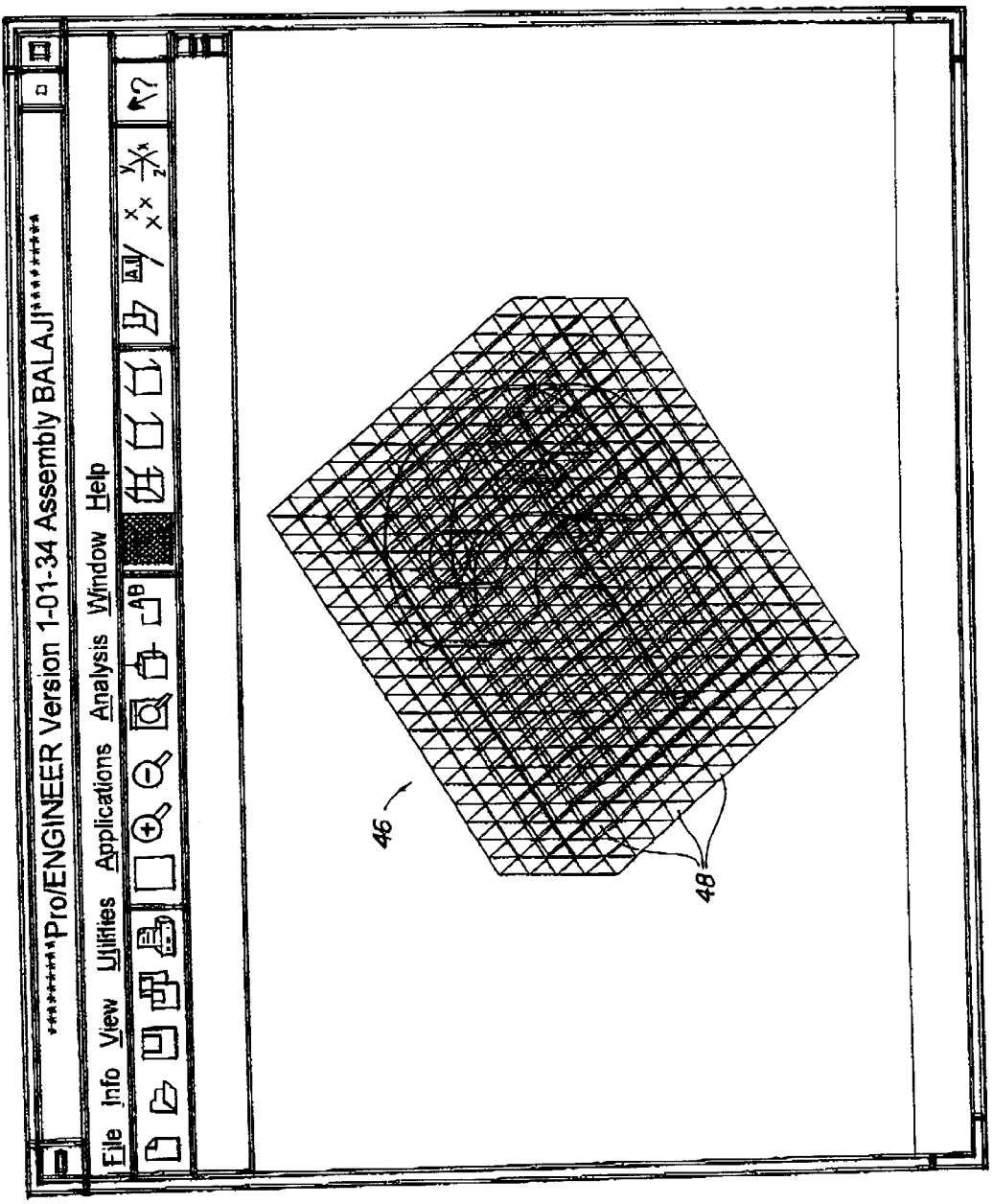
FIG. 5 illustrates the geometrical representation of FIG. 4 enclosed in a bounding box that is sub-divided into a number of cells.
Figure 6:
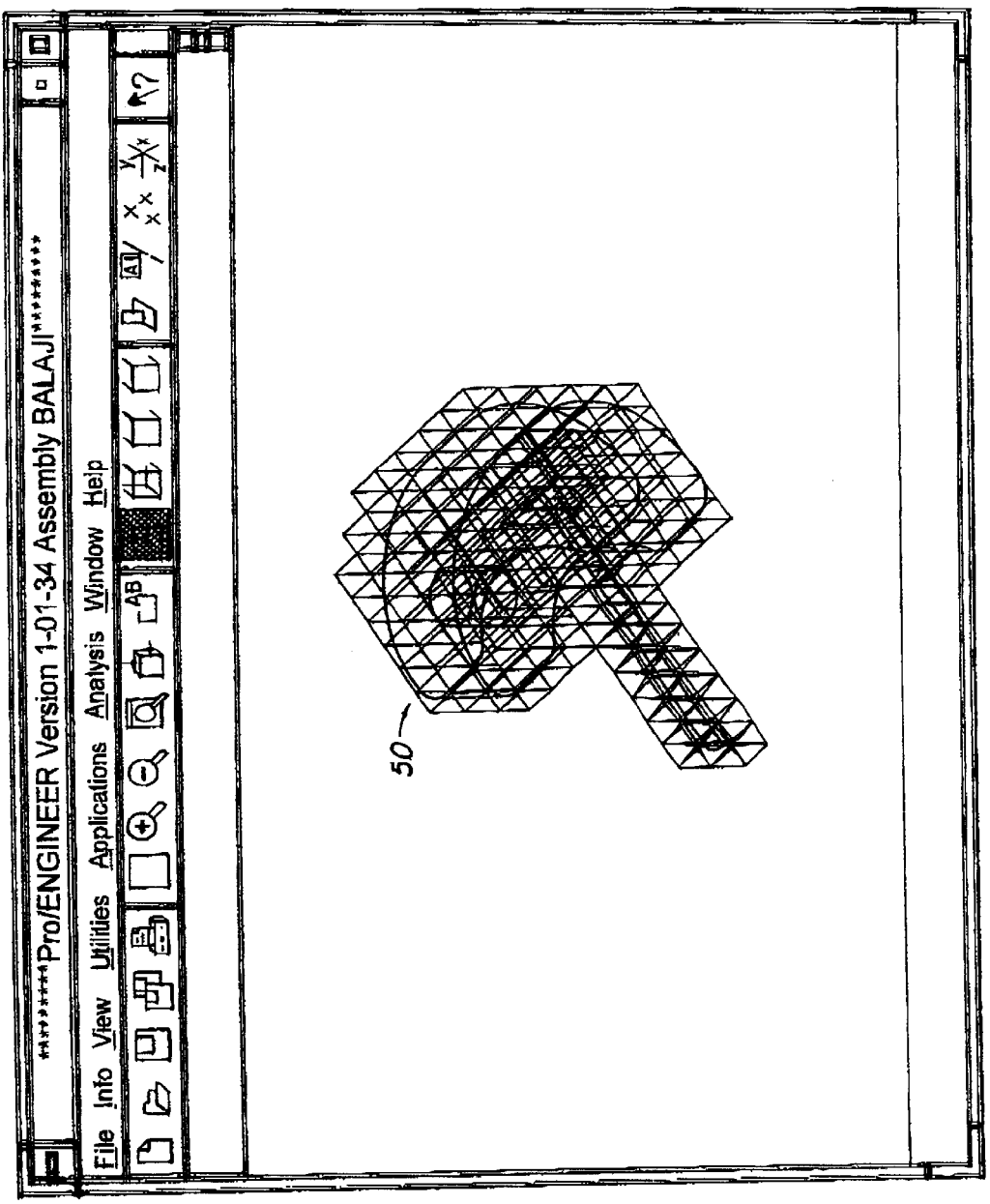
FIG. 6 illustrates the geometrical representation of FIG. 4 and a subset of the cells of FIG. 5 obtained by removal of those cells in FIG. 5 that lie beyond the outer surfaces of the geometrical representation.

FIG. 5 shows the geometrical representation 44 enclosed within a bounding box 46 that is sub-divided into a number of cells 48 in accordance with the step 30 of the flowchart of FIG. 2. FIG. 6 illustrates a subset 50 of the cells 48, obtained through removal of those cells of FIG. 5 that lie beyond the outer surfaces of the geometrical representation 44, by employing the method of the aforementioned patent application entitled "A method and system for identifying peripheral elements of a complex model." The peripheral cells, i.e., the cells having at least an exposed face and/or an exposed edge and/or an exposed vertex, of the subset 48 contain the outer surfaces of the geometrical representation 44, i.e., the peripheral cells of the subset 50 form the outermost subset.

Figure 7:
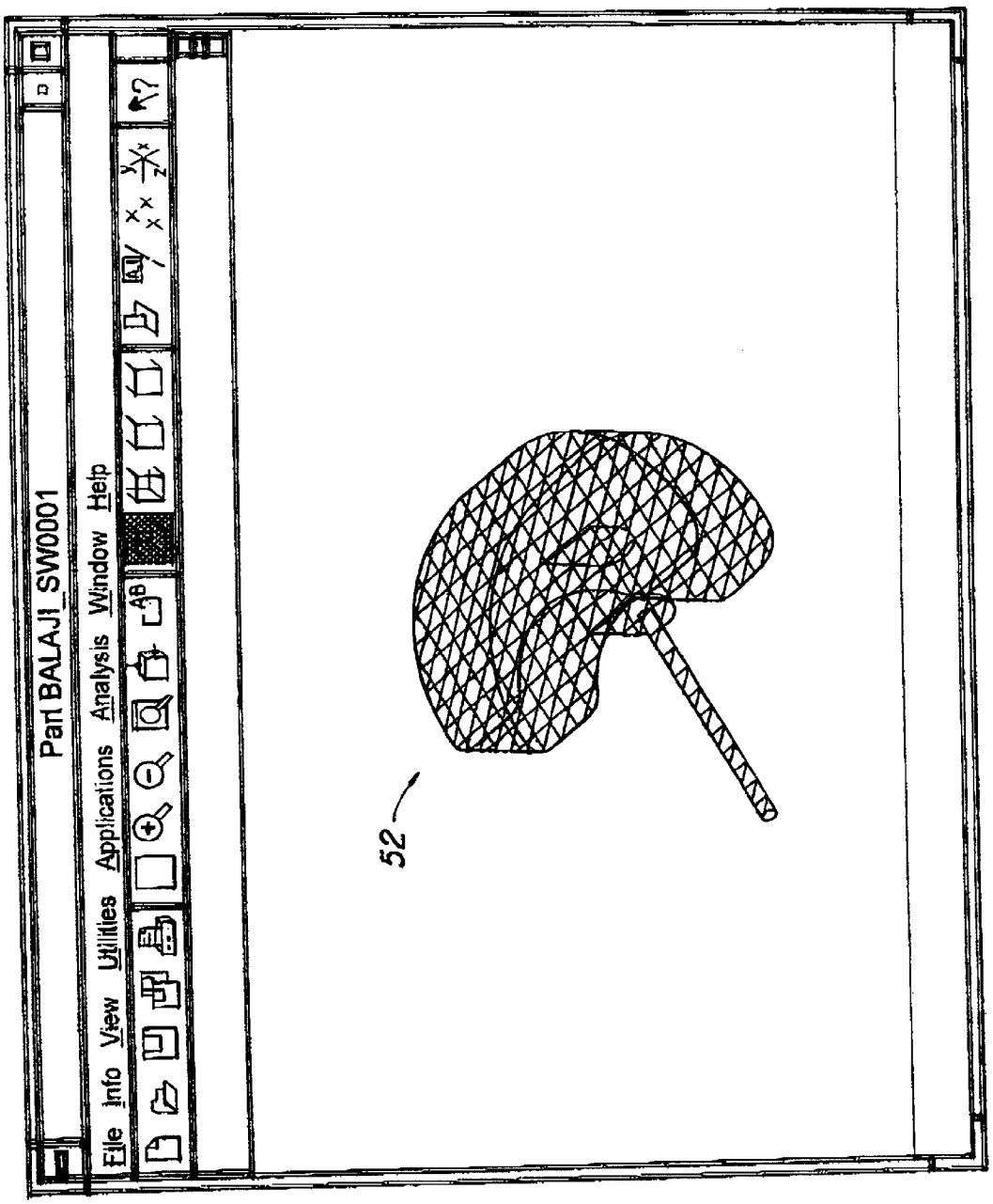
FIG. 7 illustrates a tessellated approximation of the outer envelope of the geometrical representation of FIG. 4, obtained through the illustrative embodiment of the method of the present invention.

In accordance with the procedure of the step 34 of the flow chart of the FIG. 2, each exposed face of a cell in the outermost subset is partitioned into two adjacent triangles to obtain a first set of triangles. These triangles are then snapped onto those surfaces of the geometrical representation 44 that are contained within the cells in the outermost subset, i.e., the outer envelope of the geometrical representation 44, to obtain a second set of triangles having vertices that lie on the outer envelope. The triangles in the second set provide a tessellated approximation 52 of the outer envelope of the geometrical representation 44, as shown in FIG. 7.

The tessellated approximation 52 can be supplied to a designer who only needs information regarding the geometry of the outer envelope of the assembly 44, without providing such a designer any information about the inner components and/or structures of the assembly 44. Thus, the tessellated approximation 44 can protect proprietary information relating to such inner components and/or structures.

A computer program for practicing the present invention can be written in any suitable programming language. Such a programming language can include, but is not limited to, C, C++,and Java™ (Java is a trademark of Sun Microsystems, Inc.). The method of the invention can be implemented by employing standard programming practices.

An aspect of the present invention relates to providing an approximate outer envelope of the space occupied by a moving object. In many design applications, a designer needs information about the spatial geometry of a volume of space swept by a moving object and/or a moving component of an object. In particular, such a designer may need information regarding the geometry of an outer envelope that surrounds the volume of the space occupied by the moving component as it moves from one extremum point to another in its range of motion. Such an outer envelope is referred to herein as the motion envelope of the moving component. For example, a designer designing the fenders of a car typically needs information regarding the space occupied by the tires as they rotate within their full range of motion, to ensure that the tires will not collide with the fenders. In another application, a designer may need the total motion envelope of a landing gear mechanism as it executes its full range of motion.

The method of the present invention is particularly suited for providing the motion envelope of a moving object. A particular position of a moving object relative to a reference position can be defined by a set of transformation matrices, with one matrix for each component of the object. When a tessellated approximation of the surfaces of the object is employed, each component is represented by a set of triangles. The triangles representing each component are appropriately transformed so as to obtain representations of that component in each position of the object. (Further, the method of the invention can optionally interpolate between successive positions of the components. Each edge in the triangulated representation of a component gives rise, for each pair of successive positions $P_k$ and $P_{k+1}$, to a tetrahedron whose four vertices are the two endpoints of the edge at the position $P_k$, and the two endpoints of the edge at the position $P_{k+1}$. The four triangular faces of that tetrahedron represent the motion of the edge between $P_k$ and $P_{k+1}$. Application of this procedure to each edge yields a representation of the motion of the component between $P_k$ and $P_{k+1}$. Those skilled in the art will understand that this procedure can be easily generalized to cases where the motion has more than one degree of freedom.) The union of all these sets of triangles forms a representation of the moving object. The tessellation method of the invention can be applied to such a representation to create an approximation of the outer envelope of the volume of space swept by the object as it moves in its full range of motion.

Figure 8A:
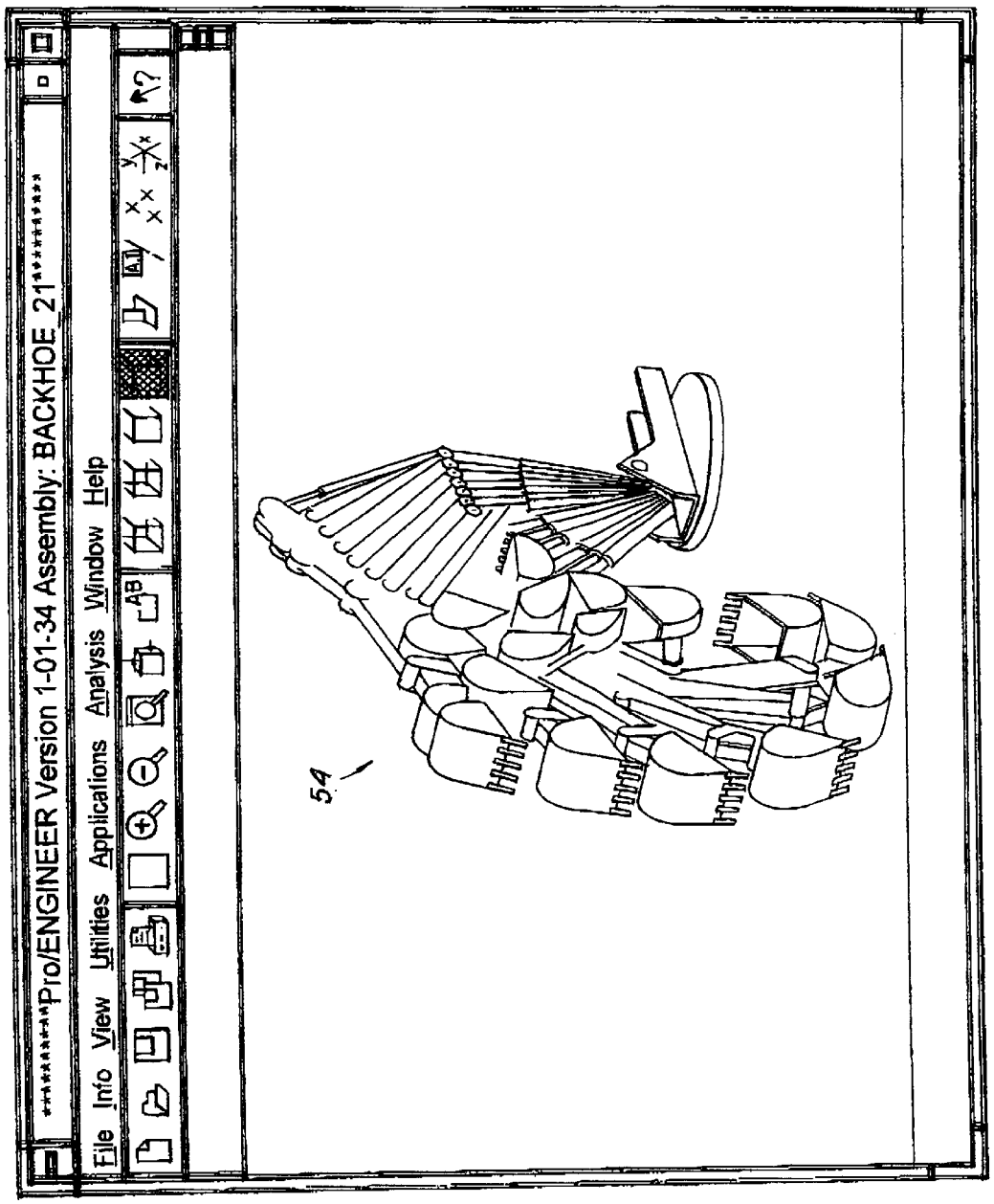
FIG. 8A illustrates several positions of a backhoe at it executes its full range of motion.
Figure 8B:
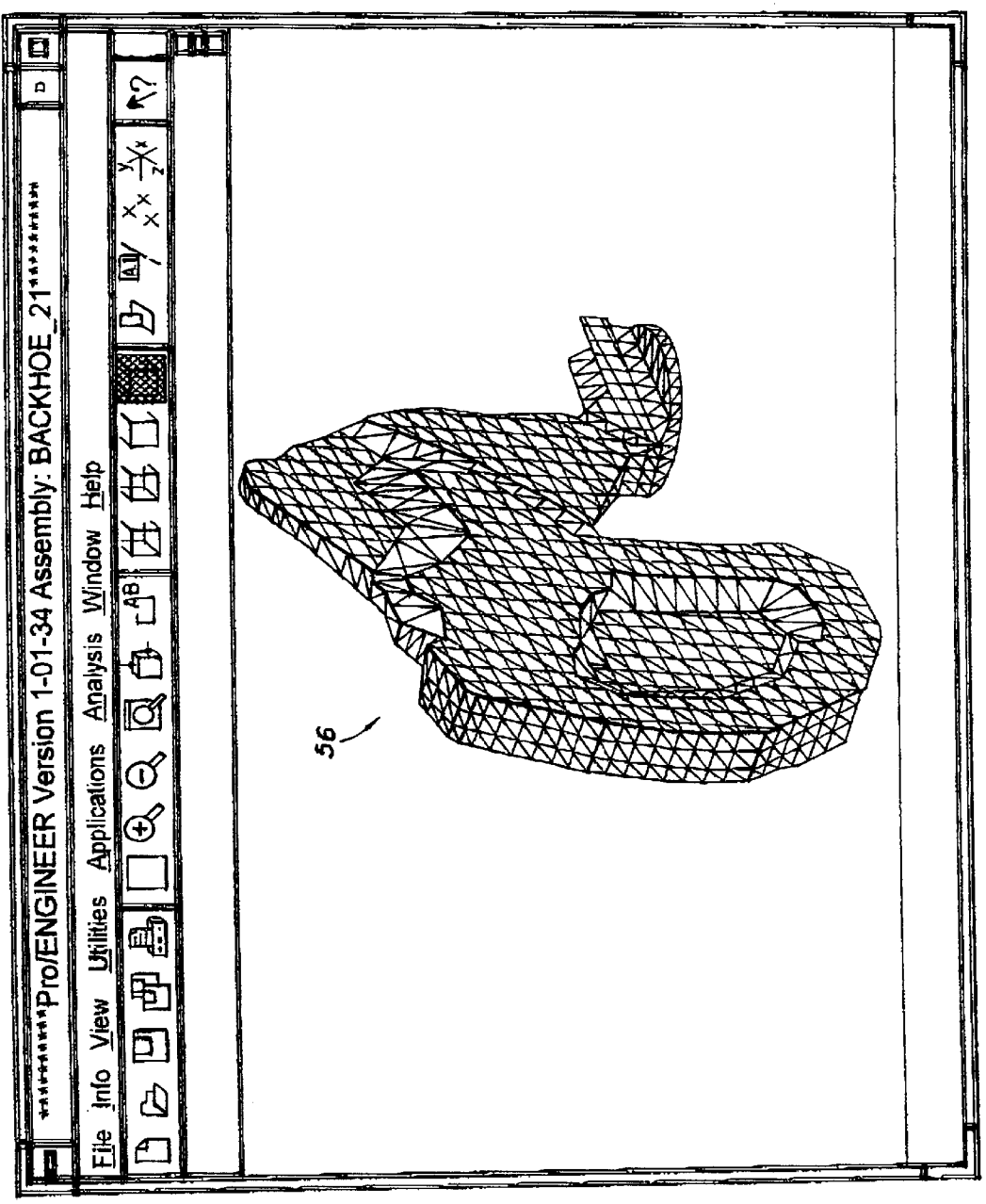
FIG. 8B illustrates a tessellated approximation of the motion envelope of the backhoe of FIG. 8A, obtained through the illustrative method of the present invention.

As an illustration of the application of the method of the invention for obtaining a tessellated approximation of the motion envelope of a moving object, FIG. 8A shows various positions of a backhoe 54 as it executes its full range of motion. FIG. 8B illustrates a tessellated approximation 56 of the motion envelope of the backhoe 54. Thus, the tessellation method of the invention can provide not only external static envelopes of objects, but also dynamic spatial allocation information for moving objects or moving components of an object.

The operations described above in connection with creating a tessellated approximation of a motion envelope of a moving object can be employed to create a tessellated approximation of the total outer envelope of a plurality of static objects. Each static object can be considered analogous to the moving object at a particular position. In particular, the method of the invention can provide a union of geometrical representations, each corresponding to one of the plurality of the static objects, to provide an approximate geometrical representation of the entire set of the objects. Subsequently, the tessellation method of the invention can be employed to create a tessellated approximation of the outer envelope of the union of the geometrical representations.

Figure 9A:
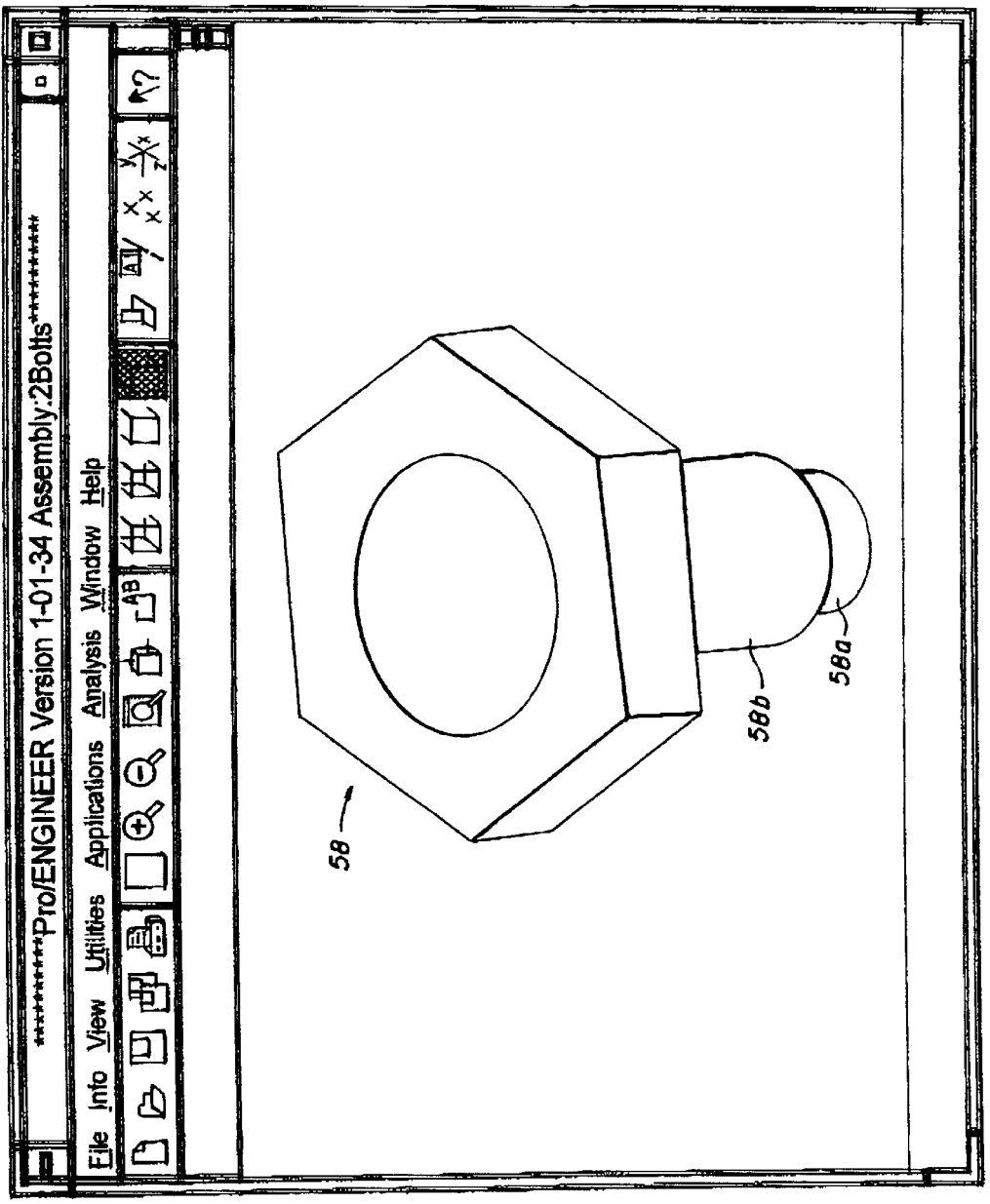
FIG. 9A illustrates a geometrical representation corresponding to a union of a plurality of static objects.
Figure 9B:
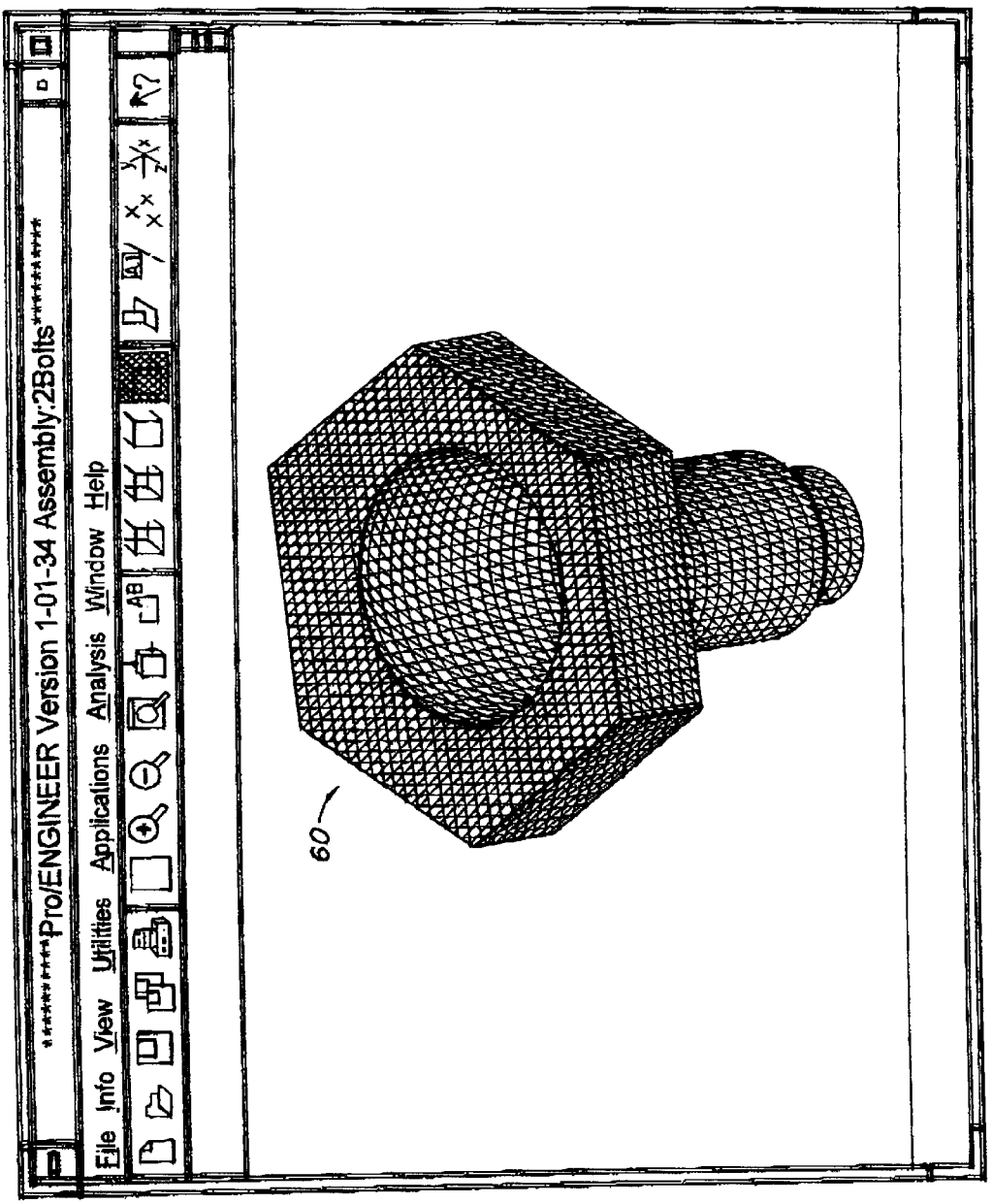
FIG. 9B illustrates a tessellated approximation of the outer envelope of the geometrical representation of FIG. 9A, created in accord with the teachings of the invention.

For example, FIG. 9A illustrates a geometrical representation 58 corresponding to a union of static objects 58a and 58b. Application of the above-described method of the invention to the geometrical representation 58 provides a tessellated approximation 60, illustrated in FIG. 9B, of the outer envelope of the plurality of these static objects.

One aspect of the present invention relates to creating a tessellated approximation of the outer envelope of a digital image, i.e., a point cloud, of a physical object. Such a digital image of a physical object can be employed in a number of applications that include, but are not limited to, reverse engineering, prototyping, and computer modeling. For example, a manufacturer of prosthetic devices may employ a point cloud of an anatomical feature of a patient for designing a prosthetic device for the patient.

A CAD/CAM system can receive data corresponding to a point cloud of a physical object, and produce a model based on such data. Subsequently, the method of the present invention can be utilized to create a tessellated approximation of the outer envelope of the model. Such a model can be utilized in various applications. For example, such a model can be compared with a design model that was employed to manufacture the object, to determine the accuracy of the manufacturing process.

Figure 10:
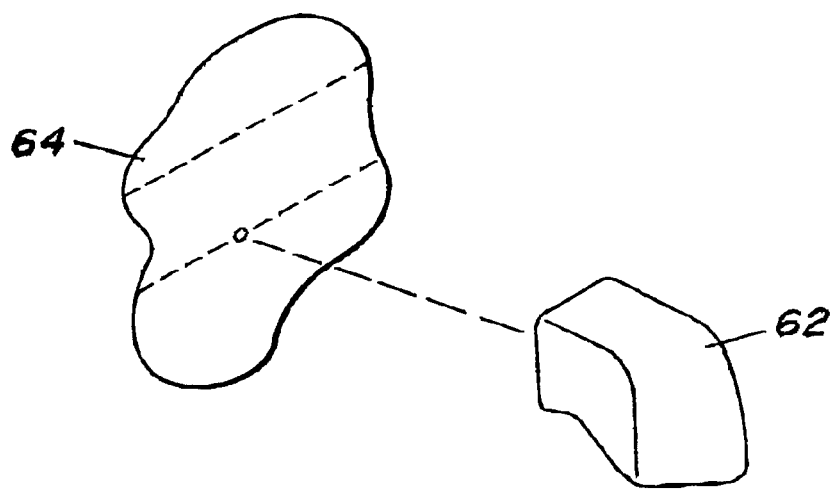
FIG. 10 illustrates schematically a digital imaging system for obtaining a point cloud of a physical object.
Figure 10A:
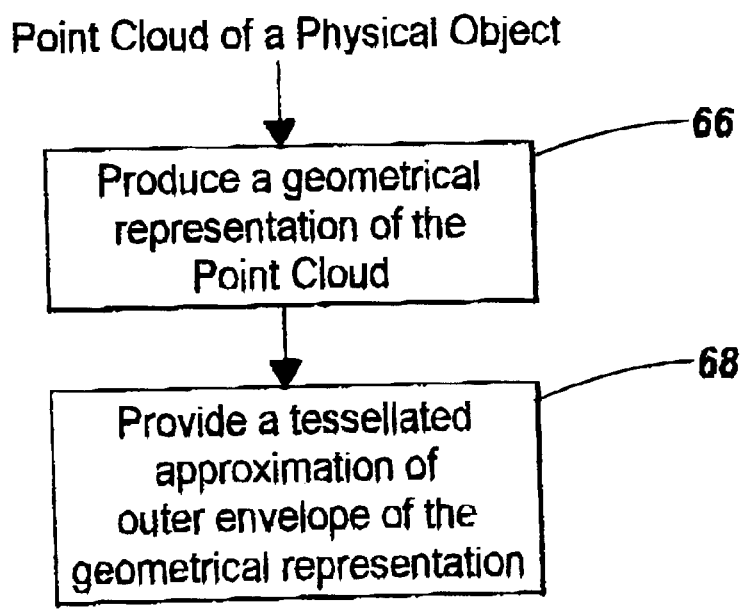
FIG. 10A is a flow chart depicting various steps of an illustrative embodiment of the invention for obtaining a tessellated approximation of an outer envelope of a point cloud of an object.

FIG. 10 schematically illustrates a digital imaging system 62 that is employed to obtain a digital image, i.e., a point cloud, of an outer surface of a physical object 64. Such systems are known in the art. For example, U.S. Pat. No. 5,886,775, herein incorporated by reference, discloses a non-contact digital imaging system that employs a scanner and a tracking system to obtain a digital image of surfaces of an object. With reference to a flow chart of FIG. 10A, the method of the invention can receive such a digital image to provide, in step 62, a geometrical representation of the image, for example by employing a CAD/CAM system. Subsequently, the tessellation method of the invention described above is employed to create a tessellated approximation of the outer envelope of the model. When the method of the invention is practiced on a point cloud of an object, snapping of the triangles on the exposed faces of the cells in the outermost subset onto the outer envelope of the geometrical representation of the point cloud, i.e., the step 36 of flow chart of FIG. 2, is achieved by finding, for each vertex, a point in the point cloud that is closer to the vertex than all the other points.

Figure 11:
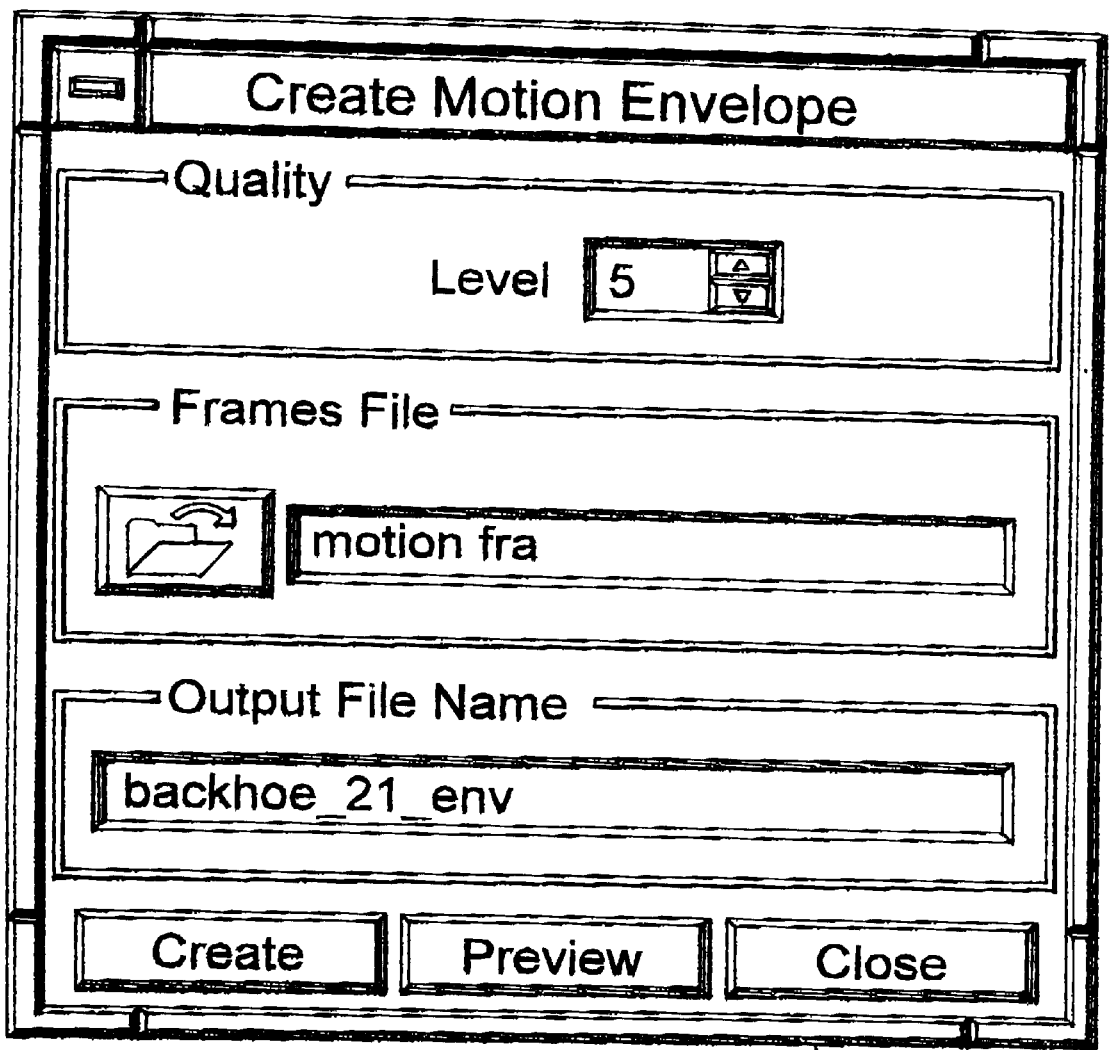
FIG. 11 illustrates a dialogue box of a CAD/CAM system incorporating the illustrative method of the present invention for obtaining a tessellated approximation of an outer envelope of a geometrical representation.

The tessellation method of the present invention can be incorporated into a CAD/CAM system as one of the utilities provided by such a system. For example, FIG. 11 illustrates a dialogue box 70 of a CAD/CAM system, such as that of the PTC Pro/Engineer 2000i, for creating a tessellated approximation of an outer envelope of a geometrical representation. The dialogue box 70 can be accessed by employing an inputting device such as a mouse.

While the present invention has been described with reference to above illustrative embodiments, those skilled in the art will appreciate that various changes in form and detail may be made without departing from the intended scope of the present invention as defined in the appended claims.

What is claimed is:

1. A computer-implemented method for creating a tessellated approximation of an outer envelope of a geometrical representation of an object, said geometrical representation being enclosed within a bounding structure, comprising the steps of:
    sub-dividing the bounding structure into a number of cells, each cell being a rectangular parallelepiped,
    providing an outermost subset of said cells by iteratively removing from consideration boundary cells not containing any portion of the geometrical representation such that each cell in the outermost subset contains at least a portion of the outer envelope of the geometrical representation and includes at least an exposed face and/or an exposed edge and/or an exposed vertex,
    partitioning each exposed face of each cell in the outermost subset into two triangles to obtain a first set of triangles, and
    snapping said first set of triangles onto the outer envelope to obtain a second set of triangles,
wherein said second set of triangles provide a tessellated approximation of the outer envelope.

2. The method of claim 1, further including the step of selecting said bounding structure and said cells to be rectangular parallelepiped.

3. The method of claim 1, wherein said geometrical representation includes a geometrical representation of an object in a CAD/CAM system.

4. In a computer platform having a facility for generating a geometrical representation of an object wherein said geometrical representation is enclosed within a bounding structure, a computer-readable medium holding computer executable instructions for performing a method for creating a tessellated approximation of an outer envelope of the geometrical representation, comprising the steps of:
    sub-dividing the bounding structure into a number of cells, each cell being a rectangular parallelepiped,
    providing an outermost subset of said cells by removing from consideration boundary cells not containing any portion of the geometrical representation such that each cell in the outermost subset contains at least a portion of the outer envelope of the geometric representation and includes at least an exposed face and/or an exposed edge and/or an exposed vertex,
    partitioning each exposed face of each cell in the outermost subset into two triangles to obtain a first set of triangles, and
    snapping said first set of triangles onto the outer envelope to obtain a second set of triangles,
wherein said second set of triangles provide a tessellated approximation of the outer envelope.

5. The method of claim 4, wherein the facility for generating a geometrical representation includes a CAD/CAM system.

6. The method of claim 4, further comprising the step of selecting said computer-readable medium to include a CD-ROM.

7. The method of claim 4, further comprising the step of selecting said computer-readable medium to include a floppy disk.

8. The method of claim 4, further comprising the step of selecting said computer-readable medium to include a hard disk.

9. In a computer platform having a facility for generating a geometrical representation of an object wherein the geometrical representation is enclosed within a bounding structure, a transmission medium for transmitting computer-executable instructions for performing a method for creating a tessellated approximation of an outer envelope of the geometrical representation, said method comprising the steps of:
    sub-dividing the bounding structure into a number of cells, each cell being a rectangular parallelepiped,
    providing an outermost subset of said cells by iteratively removing from consideration boundary cells not containing any portion of the geometrical representation such that each cell in the outermost subset contains at least a portion of the outer envelope of the geometric representation and includes at least an exposed face,
    partitioning each exposed surface of each cell in the outermost subset into two triangles to obtain a first set of triangles, and
    snapping said first set of triangles onto the outer envelope to obtain a second set of triangles,
wherein said second set of triangles provide a tessellated approximation of the outer envelope.

10. A computer-readable medium holding computer-executable instructions for obtaining a tessellated approximation of an outer envelope of a geometrical representation of an object, said geometrical representation being enclosed within a bounding structure, comprising the steps of:

sub-dividing the bounding structure into a number of cells, each cell being a rectangular parallelepiped, providing an outermost subset of said cells by removing from consideration boundary cells not containing any portion of the geometrical representation such that each cell in the outermost subset contains at least a portion of the outer envelope of the geometric representation and includes at least an exposed face and/or exposed edge and/or exposed vertex, partitioning each exposed face of each cell in the outermost subset into two triangles to obtain a first set of triangles, and snapping said first set of triangles onto the outer envelope to obtain a second set of triangles, wherein said second set of triangles provide a tessellated approximation of the outer envelope.

11. The computer-readable medium of claim 10, wherein said computer-readable medium includes a CD-ROM.

12. The computer-readable medium of claim 10, wherein said computer-readable medium includes a floppy disk.

13. The computer-readable medium of claim 10, wherein said computer-readable medium includes a hard disk.

14. A computer-implemented method for creating a tessellated approximation of a motion envelope of a moving object, comprising the steps of:

creating a union of a plurality of geometrical representations corresponding to a plurality of positions of said moving object to provide an approximate geometrical representation of a volume of space occupied by the moving object as it moves within its full range of motion, and creating a tessellated approximation of an outer envelope of said approximate geometrical representation.

15. The method of claim 14, wherein the step of creating a geometrical representation further includes the step of employing a CAD/CAM system to create said geometrical representation.

16. The computer-implemented method of claim 15, wherein the step of obtaining a tessellated approximation includes the steps of:

enclosing said approximate geometrical representation in a bounding structure, sub-dividing the bounding structure into a number of cells, each cell being a rectangular parallelepiped, providing an outermost subset of said cells by iteratively removing from consideration boundary cells not containing any portion of the geometrical representation such that each cell in the outermost subset contains at least a portion of the outer envelope of the geometric representation and includes at least an exposed face and/or exposed edge and/or exposed vertex, partitioning each exposed face of each cell in the outermost subset into two triangles to obtain a first set of triangles, and snapping said first set of triangles onto the outer envelope to obtain a second set of triangles, wherein said second set of triangles provide a tessellated approximation of the motion envelope.

17. A computer-implemented method for creating a tessellated approximation of an outer envelope of a plurality of static objects, said method comprising the steps of:

creating a union of geometrical representations wherein each geometrical representation corresponds to one of said plurality of static objects, enclosing said union of geometrical representations within a bounding structure, sub-dividing the bounding structure into a number of cells, each cell being a rectangular parallelepiped, providing an outermost subset of said cells by removing from consideration boundary cells not containing any portion of the geometrical representation such that each cell in the outermost subset contains at least a portion of the outer envelope of the geometrical representation and includes at least an exposed face and/or exposed edge and/or exposed vertex, partitioning each exposed face of each cell in the outermost subset into two triangles to obtain a first set of triangles, and snapping said first set of triangles onto the outer envelope of said union of geometrical representations to create a tessellated approximation of the outer envelope.

18. A computer-implemented method for creating a tessellated approximation of a point cloud of a physical object, said method comprising the steps of:

providing a geometrical representation of the point cloud, enclosing the geometrical representation within a bounding structure, sub-dividing the bounding structure into a number of cells, each cell being a rectangular parallelepiped, providing an outermost subset of said cells by iteratively removing from consideration boundary cells not containing any portion of the geometrical representation such that each cell in the outermost subset contains at least a portion of the outer envelope of the geometrical representation and includes at least an exposed face and/or exposed edge and/or exposed vertex, partitioning each exposed face of each cell in the outermost subset into two triangles to obtain a first set of triangles, and snapping said first set of triangles onto the outer envelope to obtain a tessellated approximation of the point cloud.

19. A computer-readable medium holding computer-executable instructions for creating a tessellated approximation of an outer envelope of a geometrical representation of an object according to a method comprising the steps of:

enclosing the geometrical representation within a bounding structure, sub-dividing the bounding box into a number of cells, each cell being a rectangular parallelepiped, providing an outermost subset of said cells by removing from consideration boundary cells not containing any portion of the geometrical representation such that each cell in the outermost subset contains at least a portion of the outer envelope of the geometrical representation and includes at least an exposed face and/or an exposed edge and/or an exposed vertex, partitioning each exposed face of each cell in the outermost subset into two triangles to obtain a first set of triangles, and snapping said first set of triangles onto the outer envelope to create a tessellated approximation of the outer envelope.

* * * * *